US011167224B2

(12) United States Patent
Torras-Piqué

(10) Patent No.: US 11,167,224 B2
(45) Date of Patent: Nov. 9, 2021

(54) SEDIMENTATION DEVICE

(71) Applicants: 3P Technik Filtersysteme GmbH, Bad Überkingen (DE); H2O Research GmbH, Münster (DE)

(72) Inventor: Jorge Torras-Piqué, Bad Überkingen (DE)

(73) Assignees: 3P TECHNIK FILTERSYSTEME GMBH, Bad Überkingen (DE); H2O RESEARCH GMBH, Münster (DE)

(*) Notice: Subject to any disclaimer, the term of this patent is extended or adjusted under 35 U.S.C. 154(b) by 0 days.

(21) Appl. No.: 16/810,260

(22) Filed: Mar. 5, 2020

(65) Prior Publication Data

US 2020/0282339 A1 Sep. 10, 2020

(30) Foreign Application Priority Data

Mar. 7, 2019 (DE) .......................... 102019203116.1

(51) Int. Cl.
*B01D 21/24* (2006.01)
*E03F 5/14* (2006.01)
(Continued)

(52) U.S. Cl.
CPC ...... *B01D 21/2411* (2013.01); *B01D 21/0012* (2013.01); *B01D 21/0087* (2013.01);
(Continued)

(58) Field of Classification Search
CPC ........ E03F 5/0403; E03F 5/14; B01D 21/003; B01D 21/0087; B01D 21/2411; B01D 21/2444; B01D 2221/12; C02F 2103/001
(Continued)

(56) References Cited

U.S. PATENT DOCUMENTS 3,789,987 A * 2/1974 Malaspina ............ E03F 5/0405
210/533
3,875,066 A * 4/1975 Lind .................. B01D 21/2444
210/521
(Continued)

FOREIGN PATENT DOCUMENTS

CN 203469563 U 3/2014
DE 19953961 A1 5/2001
(Continued)

*Primary Examiner* — Christopher Upton
(74) *Attorney, Agent, or Firm* — Hoffmann & Baron, LLP

(57) ABSTRACT

A sedimentation device for material which is contained in fluid, in particular rainwater, includes a sedimentation insert (12) which in the position of use is inserted into a shaft element (12), wherein the sedimentation insert (12) includes a run-in chamber, said run-in chamber being delimited by a run-in chamber side wall (20) which provided with a lateral run-in opening (19) and on its lower side having an outlet opening (23), wherein a flow-breaking device (24) for breaking the flow of a fluid flow which is produced in a throughflow direction (26) between the run-in opening (19) and a run-out opening (25) is assigned to the outlet opening (23), and wherein the sedimentation insert includes a run-out chamber (32) which annularly surrounds the run-in chamber (18) and which is delimited by an inner run-out chamber side wall, a base (33) and an outer run-out chamber side wall (34), wherein the run-out opening (25) is formed on the delimitation of the run-out chamber (32) and wherein the outer run-out chamber side wall (34) is designed as a spillway (38).

19 Claims, 4 Drawing Sheets

(51) Int. Cl.
 *B01D 21/00* (2006.01)
 *C02F 1/00* (2006.01)
 *C02F 103/00* (2006.01)

(52) U.S. Cl.
 CPC ................ *C02F 1/004* (2013.01); *E03F 5/14* (2013.01); *C02F 2001/007* (2013.01); *C02F 2103/001* (2013.01)

(58) Field of Classification Search
 USPC ..... 210/170.03, 519, 521, 532.1, 747.3, 801
 See application file for complete search history.

(56) References Cited

U.S. PATENT DOCUMENTS

| | | | | |
|---|---|---|---|---|
| 3,965,013 | A | * | 6/1976 | Jackson ............. B01D 21/2411 210/519 |
| 6,019,898 | A | | 2/2000 | Johnson |
| 6,780,310 | B1 | * | 8/2004 | Howe ................... E03F 5/0404 210/170.03 |
| 7,182,874 | B2 | * | 2/2007 | Allard ....................... E03F 5/14 210/170.03 |
| 7,422,683 | B2 | * | 9/2008 | Park ........................ E03F 5/14 210/170.03 |
| 7,507,333 | B2 | * | 3/2009 | Meyermann ....... B01D 21/0087 210/170.03 |
| 10,710,907 | B2 | * | 7/2020 | Bryant ..................... E03F 5/14 |
| 2004/0025946 | A1 | | 2/2004 | Sharb |
| 2007/0012608 | A1 | | 1/2007 | Su et al. |
| 2008/0121579 | A1 | * | 5/2008 | Dierkes ................. E03F 5/0404 210/170.03 |
| 2008/0185321 | A1 | | 8/2008 | Beaulieu |
| 2019/0078309 | A1 | * | 3/2019 | Recchia .................... E03F 5/14 |

FOREIGN PATENT DOCUMENTS

| | | | |
|---|---|---|---|
| EP | 1651325 | B1 | 5/2006 |
| EP | 2957683 | B1 | 12/2015 |
| KR | 20110037243 | A | 4/2011 |
| WO | 0062888 | | 10/2000 |
| WO | 2014146178 | A1 | 9/2014 |
| WO | WO 2020/006592 | * | 1/2020 |

* cited by examiner

SEDIMENTATION DEVICE

BACKGROUND OF THE INVENTION

The invention relates to a sedimentation device for material which is contained in fluid, in particular rainwater.

Such sedimentation devices have already been known for some time now. An important field of application of such sedimentation devices is the separation of material from rainwater, in particular contamination, dust, dirt etc. which is carried along in the event of a downpour. Concerning rainwater retention systems which are filled after heavy downpours, it is necessary to lead away the accumulated rainwater again. A discharge of the accumulated rainwater without bringing a sedimentation device into the sewage system or for the purpose of infiltration/seepage is problematic.

A sedimentation device in the form of a hydrodynamic treatment device is described for example in EP 1 651 325 B1. The treatment device which is disclosed there comprises a cylindrical outer wall, on whose lateral surface an inlet for fluid is formed. The inlet leads into an accumulation space which in turn runs out into an outer separation chamber. A funnel-shaped base element with a central opening, via which the outer separation chamber is connected to a sedimentation space or sump, is located on the lower side of the outer separation chamber. An inner separation chamber which likewise comprises a cylindrical chamber wall passes through the outer separation chamber. Inlet openings are formed in the lateral surface of this chamber wall, into which inlet openings fluid, in particular water can flow into the inner separation chamber from the outside to the inside. The inner separation camber is closed at the base side so that fluid rises after entering into the inner separation chamber and gets to an outlet which is likewise formed on the lateral surface of the chamber wall, and from there flows away out of the treatment device. The flow through the treatment device is therefore effected from the outside to the inside, wherein the flow is firstly led downwards via the sump and from there is directed upwards again.

A waste water treatment arrangement is described in EP 2 957 683 B1, said arrangement comprising a shaft, into which an annular space pair with, considered in the height direction of the shaft, an upper annular space and a lower annular space is received. The waste water treatment arrangement is subjected to throughflow by a rising flow, which means that a run-in and a discharge which is situated at a higher level in relation to this are located on the lateral surface of the shaft, wherein several annular space pairs are received in the inside of the shaft and are subjected to throughflow by a rising flow, so that suspended substances or sediment which are located in the water or in the fluid are held back.

SUMMARY OF THE INVENTION

It is the object of the invention to provide a sedimentation device which is constructed in a simple manner, is inexpensive and with which a high throughput of fluid to be purified is possible.

This object is achieved by a sedimentation device with the features of the independent claim 1. Further developments of the invention are specified in the dependent claims.

The sedimentation device according to the invention, for material which is contained in fluid, in particular rainwater, comprises a sedimentation insert which in the position of use is inserted into a shaft element, wherein the sedimentation insert comprises a run-in chamber, said run-in chamber being delimited by a run-in chamber side wall and being provided with a lateral run-in opening and on its lower side comprising an outlet opening, wherein a flow-breaking device for breaking the flow of a fluid flow which is produced in a throughflow direction between the run-in opening and a run-out opening is assigned to the outlet opening, and wherein the sedimentation insert comprises a run-out chamber which annularly surrounds the run-in chamber and which is delimited by an inner run-out chamber side wall, a base and an outer run-out chamber side wall, wherein the run-out opening is formed on the delimitation of the run-out chamber and wherein the outer run-out chamber side wall is designed as a spillway (over-fall).

In this case, the throughflow is therefore effected from the inside to the outside and from there via a spillway to the run-out opening. In the position of use of the sedimentation device, the annular space between the shaft wall and the sedimentation insert can form an outer chamber, whereas the inside of the sedimentation insert can form the inner chamber which is firstly subjected to onflow, before the fluid enters into the outer chamber. An adaption of the shaft elements to the sedimentation insert is not necessary, which means that the sedimentation insert can be inserted into a shaft element in a simple manner Fluid consequently firstly runs into the run-in chamber which is designed in a manner such that a fluid flow which permits a high throughput through the sedimentation insert is rendered possible. The fluid flow however is broken by the flow-breaking device, by which means settled sediment is prevented from being swirled up again. The fluid which rises after passing the outlet opening is largely free of sediment and via the spillway then gets to the run-out opening.

The run-in chamber side wall is particularly advantageously designed in a cylindrical manner.

The run-in chamber particularly advantageously comprises a run-in section which is assigned to the run-in opening and an outlet section which assigned to the outlet opening and which in the throughflow direction is arranged downstream of the run-in section.

Usefully, the outlet section is designed in a funnel-shaped manner.

Concerning a further development of the invention, the inner run-out chamber side wall is formed by the run-in chamber side wall. Alternatively however, it would also be conceivable for the run-out chamber to comprise an inner run-out chamber side wall which is formed separately from the run-in chamber side wall.

In a particularly advantageous manner, a flow guidance element is arranged in the run-in chamber downstream of the run-in opening in the throughflow direction, in a manner such that inflowing fluid can be brought into a tangential flow. The flow guidance element can be designed for example as a deflector, in particular in the form of a deflector plate, which lies in the flow path of the fluid which flows in through the run-in opening.

Concerning a further development of the invention, the spillway is designed as a weir.

In a particularly preferred manner, the weir is designed as jags with a multitude of jags which in the peripheral direction of the outer run-out chamber side wall form the upper edge of the outer run-out chamber side wall.

Usefully, the jags have the shape of equilateral triangles. However, other overflow flow cross sections, in particular other triangular geometries can be applied. Herein, what is important is that a uniform flow over the weir is possible, even if the weir is not aligned in an exactly horizontal manner.

Concerning a further development of the invention, the flow-breaking device comprises at least one, in particular several flow-breaking elements which are perpendicular to the flow direction. Herein, what is important is the fact that in particular a tangential flow which is predominant in the run-in chamber is broken by way of the flow-breaking elements, so that the sump or sedimentation space which is located below the run-in chamber is free of turbulent flow, which prevents a swirling up of settled sediment.

In a particularly preferred manner, the flow-breaking elements are arranged downstream of the outlet opening in the throughflow direction.

Usefully, the flow-breaking elements are designed in a sword-like manner.

In a particularly preferred manner, the flow-breaking elements form a stand frame, on which the sedimentation insert stands in the shaft element in the position of use.

Concerning a further formation of the invention, the flow-breaking device comprises a grating which is preferably arranged in or below the outlet opening.

Usefully, the run-out opening is arranged on the outer run-out chamber side wall.

In a particularly preferred manner, the run-out opening is adjustable in height. By way of this, it is possible to compensate a height difference between a discharge opening which is formed on the shaft element and the run-out opening of the sedimentation insert. The height adjustability can be carried out for example by way of a slider with an aperture opening, said slider being adjustable in height.

In a particularly preferred manner, the sedimentation insert consist of plastic. For example, the sedimentation insert can be a plastic part which is manufactured by way of rotation moulding.

BRIEF DESCRIPTION OF THE DRAWINGS

A preferred embodiment example is explained in more detail in the drawing and is explained in more detail hereinafter. In the drawings are shown.

DETAILED DESCRIPTION

FIGS. 1 to 6 show a preferred embodiment example of the sedimentation device 11 according to the invention. The sedimentation device 11 is hereinafter described by way of example concerning the application for separating material, in particular sediment in the form of dirt particles, which is contained in rainwater. Basically, it would be possible to also treat fluids other than water with the sedimentation device 11, but the main field of application is the treatment of precipitation, in particular rainwater.

In the described example, the sedimentation device 11 can be arranged upstream or downstream of a rain retention basin or in the rain retention basin, so that rainwater water which is accumulated in the rain retention basin can be led away via a sedimentation device. An untreated discharge of accumulated rainwater for example from a rain retention basin into the sewage system, into a body of water or for the purpose of seepage is no longer allowable according to the separation stipulations of the law, so that there is the necessity to treat such accumulated rainwater.

The application of the sedimentation device 11 according to the invention however is no longer restricted by a rain retention basin, but the sedimentation device 11 can be applied wherever rainwater is released into the sewage system, into a body of water or for seepage.

Figure 1:
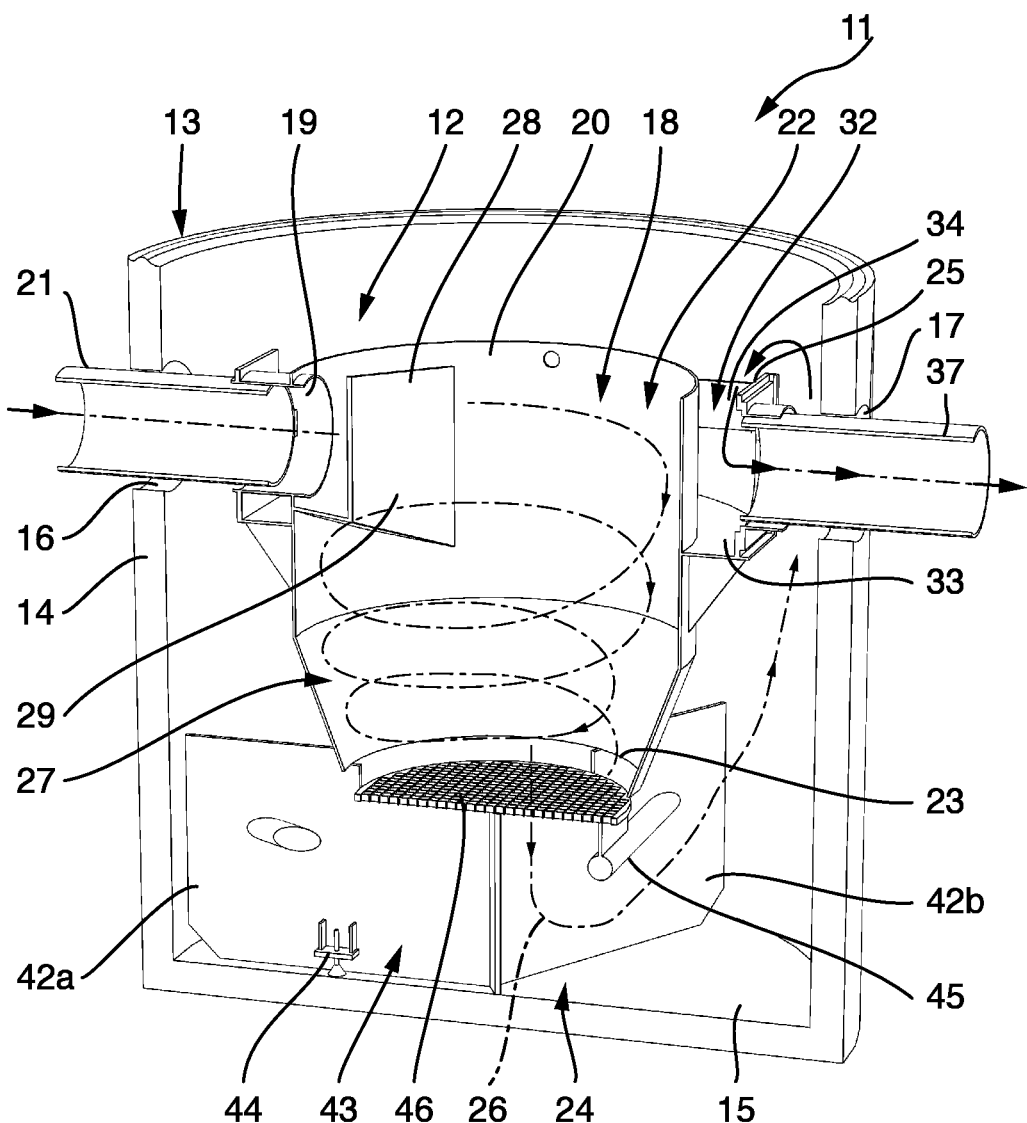
FIG. 1 a longitudinal section through a preferred embodiment example of the sedimentation device according to the invention, FIG. 2 a perspective plan view of the sedimentation device of FIG. 1, FIG. 3 a perspective view of the sedimentation insert of the sedimentation device of FIG. 1, FIG. 4 a perspective view from a direction which is different to FIG. 3, onto the sedimentation insert of FIG. 1, FIG. 5 a lateral view onto the sedimentation insert of FIG. 3 and FIG. 6 a lateral view of the sedimentation insert of FIG. 3, said lateral view being rotated by 90° with respect to FIG. 5.

As is particularly represented in FIG. 1, the sedimentation device 11 comprises a sedimentation insert 12 which in the position of use is inserted into a shaft element 13. The shaft element 13 which is shown in FIG. 1 by way of example as a rule consists of a concrete material and is entrenched in the earth. The shaft element 13 comprises a shaft jacket 13 which is open at the upper side and at the lower side is closed by a shaft base 15. The lower part of the shaft element 13 and the shaft base 15 together form a sump or a sediment collection space. The shaft jacket 14 usefully has a cylindrical shape.

Due to the fact that the shaft element 13 is open to the top, the sedimentation insert 12 can be inserted from the top into the shaft element 13 in a simple manner. As is particularly shown in FIG. 1, the shaft element 13 on the shaft jacket 14 comprises a shaft run-in opening 16 and a shaft discharge opening 17 which is arranged on the shaft jacket 14 in a manner lying diametrically opposite this shaft run-in opening with respect to a shaft element longitudinal axis.

The sedimentation insert 12, in contrast to the shaft element 13, is usefully a plastic component. The sedimentation insert 12 can be manufactured for example by way of plastic rotation moulding.

The sedimentation insert 12 comprises a run-in chamber 18 which is delimited by a run-in chamber side wall 20 which is provided with a lateral run-in opening 19.

Figure 2:
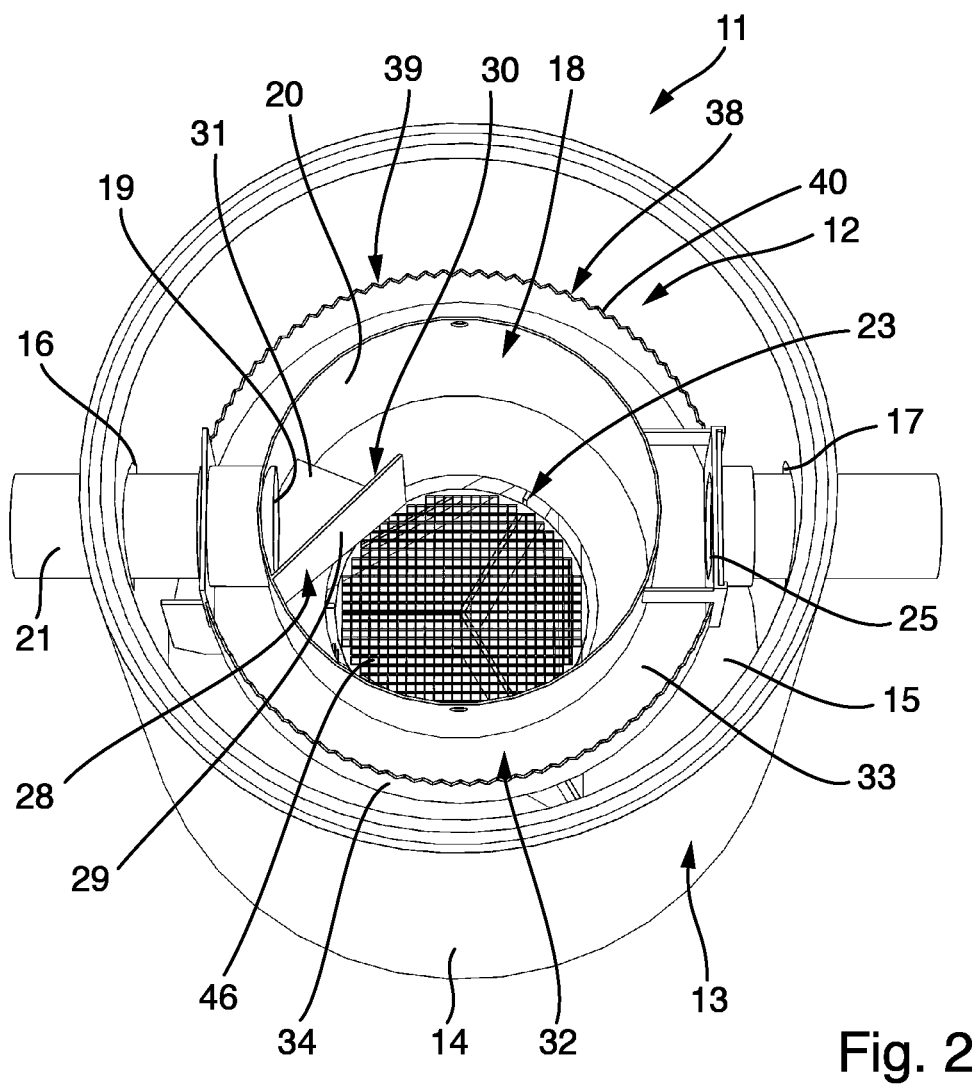

As is shown in FIGS. 1 and 2, the run-in opening 10 of the run-in chamber 18 is connected to a shaft run-in opening 16 via a run-in tube 21, wherein the run-in tube 21 projects beyond the outer side of the shaft jacket 14.

The run-in chamber 18 comprises a run-in section 22 which is assigned to the run-in opening 19. The run-in section 22 is delimited by a cylindrical part of the run-in chamber side wall 20.

The run-in chamber 18 on its lower side comprises an outlet opening 23, wherein a flow-breaking device for breaking the flow of a fluid flow which is produced between the run-in opening 19 and a run-out opening 24 in a throughflow direction 25 is assigned to the outlet opening 23.

The run-in chamber 18 comprises an outlet section 27 which is arranged downstream of the run-in section 22 of the run-in chamber 18 in the throughflow direction, is assigned to the outlet opening 23 and in this example is designed in a funnel-shaped manner. The outlet section 27 usefully forms a hydrodynamic separator. The outlet opening 23 is located on the underside of the outlet section 27.

As can be particularly recognised in FIG. 2, a flow guidance element 28 in the form of a deflector is arranged in the run-in chamber 18 downstream of the run-in opening 19 in the throughflow direction 26 in a manner such that inflowing water is brought into a tangential flow. In the shown example, the flow guidance element 28 in the form of the deflector is designed as an angle section which is usefully connected as one piece to the run-in chamber side wall 20. The deflector comprises a vertical limb 29 which, as is shown in FIG. 2, runs in the height direction of the run-in chamber 18 and is aligned obliquely with respect to the mouth surface of the run-in opening 19 and specifically in a manner such that inflowing water bounces off the inner wall of the vertical limb 29 which serves as a guidance surface 20 and is led in the direction of the inner wall of the run-in chamber side wall 20, where a tangential flow is then produced. The vertical limb 29 is connected as one piece to a horizontal limb 21 which is connected in an angled manner to the vertical limb 29 and is likewise connected as one piece to the run-in chamber side wall 20.

Figure 3:
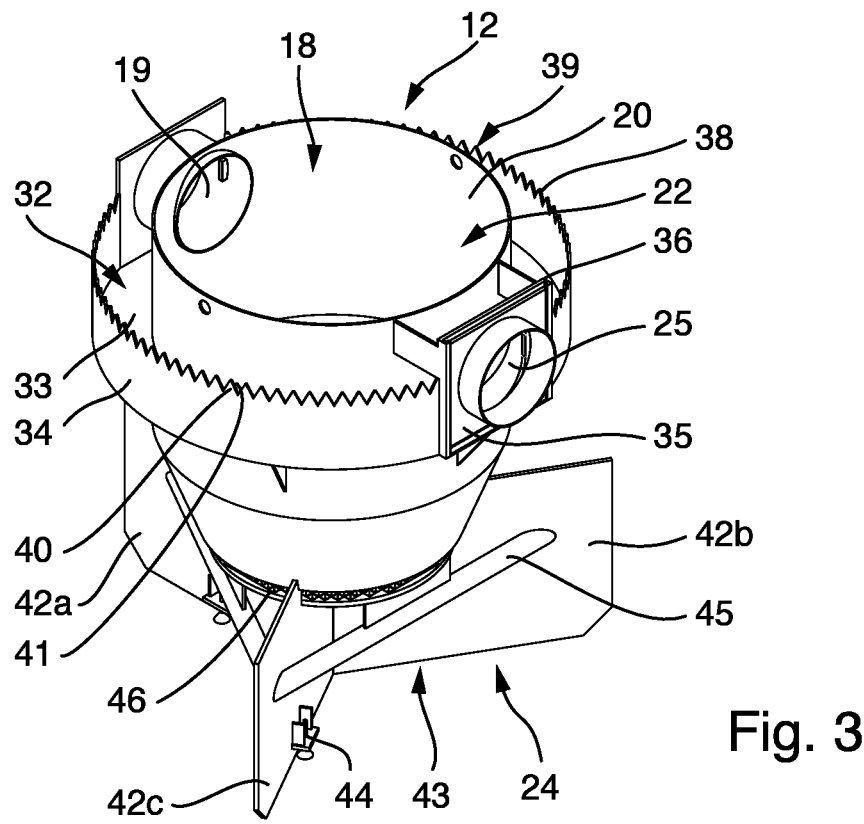
Figure 4:
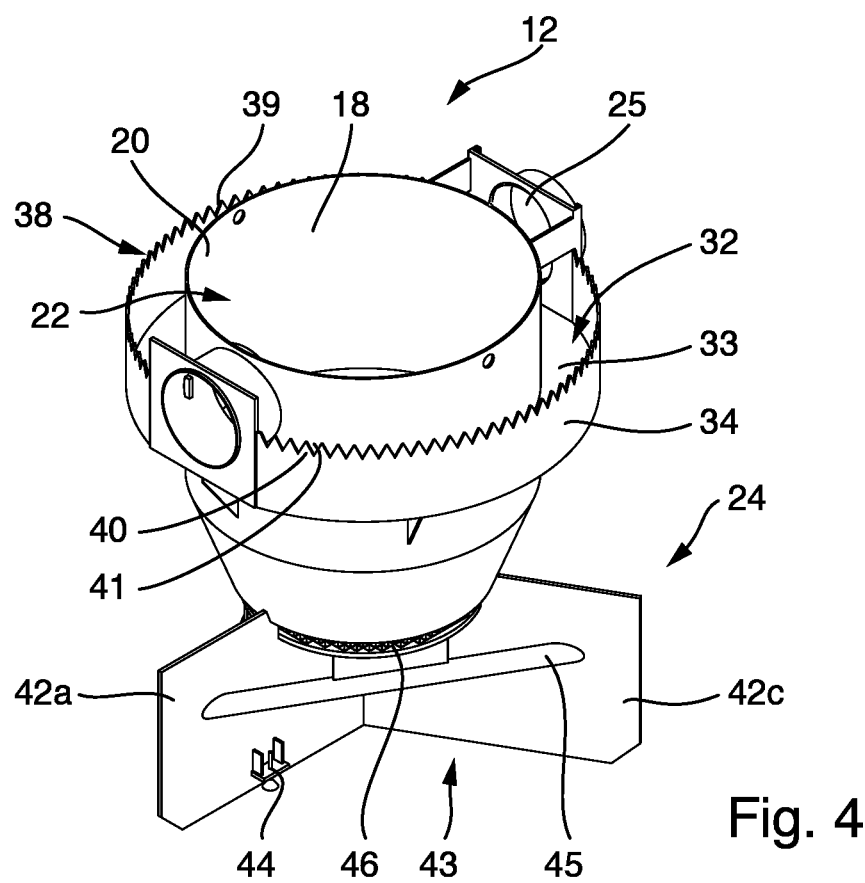
Figure 5:
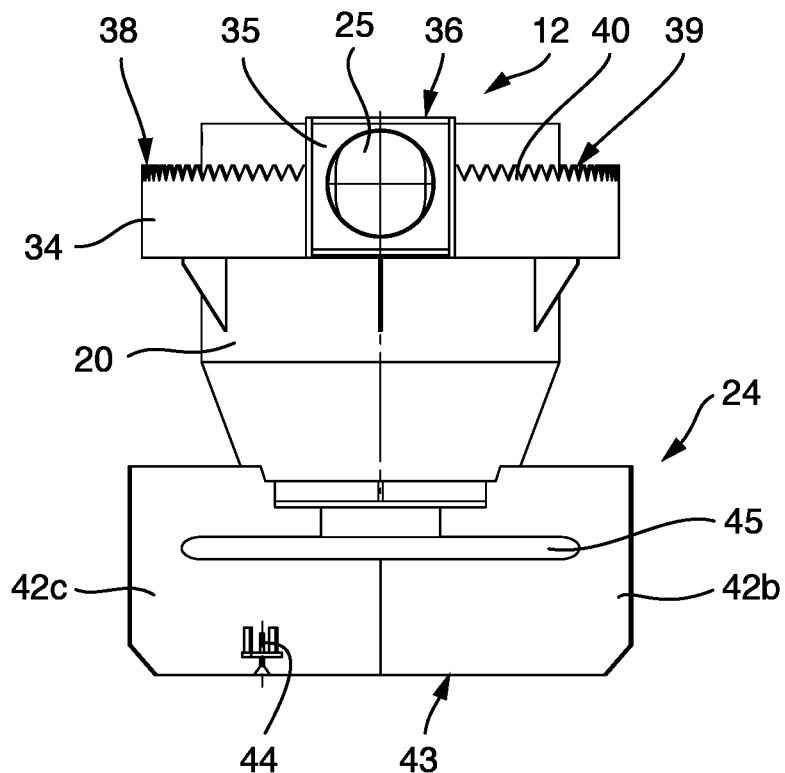
Figure 6:
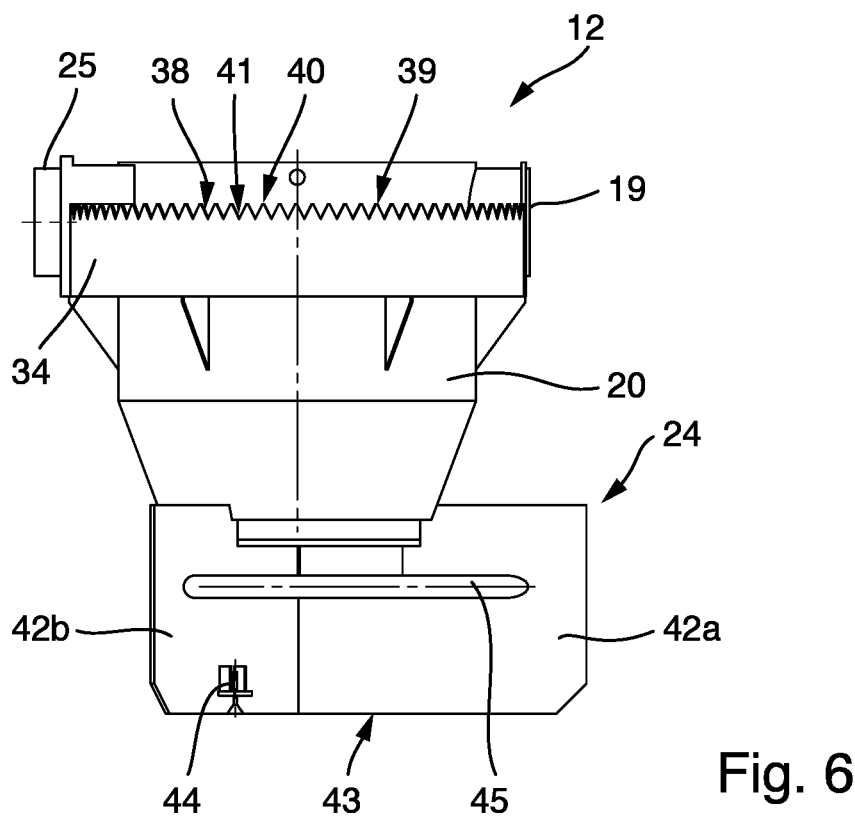

As is particularly shown in FIGS. 3 and 4, the sedimentation insert 12 has a run-out chamber 32 which annularly surrounds the run-in chamber 18 and which is delimited by an inner run-out chamber side wall, a base 33 and an outer run-out chamber side wall 34. As is particularly shown in FIGS. 3 and 4, the inner run-out chamber side wall in this example is formed by the run-in chamber side wall. The base of the run-out chamber 32 and the outer run-out chamber side wall 34 are connected as one piece to the run-in chamber side wall 20. As is particularly shown in FIG. 2, the run-out opening 25 is located on the delimitation of the run-out chamber 32, in particular on the outer run-out chamber side wall 34.

As is particularly evident on looking at FIGS. 3 and 4 together, the run-out opening 25 is adjustable in height.

The height-adjustability is achieved by way of the run-out opening 25 being a constituent of a slider 35 which is mounted in a height-adjustable manner on a slider guide 36 on the outer run-out chamber side wall 34.

As is particularly represented in FIGS. 1 and 2, the run-out opening 25 is connected to the shaft discharge opening 17 via a run-out pipe 37. The height adjustability of the run-out opening 25 in particular by way of the slider 35 serves for compensating a height difference between the run-out opening 25 and the shaft discharge opening 17.

As is particularly shown in FIG. 2 and also in the FIGS. 3 to 6, the outer run-out chamber side wall 34 is designed as a spillway 38. The spillway 38 in the example is designed as a weir, usefully as a jagged weir. The jagged weir comprises a row of jags 39 which forms the upper edge of the outer run-out chamber side wall 34 and which has a multitude of jags 40 which in the peripheral direction in particular are arranged at a uniform distance to one another. The jags 40, which can also be described as teeth, in this exemplary case have the shape of equilateral triangles. Herewith, triangular overflow cross sections 41, in particular overflow cross sections which have the shape of equilateral triangles, are formed between adjacent jags 40. The triangular overflow cross sections 41 permit a uniform overflow of water which from the outside and flowing over the jagged weir flows into the run-out chamber.

As is particularly shown in FIGS. 3 and 4, the sedimentation insert 12 is provided with a flow-breaking device 24. The flow-breaking device 24 is assigned to the outlet opening 23 and serves for the breaking the flow of the turbulent tangential flow in the run-in chamber. This has the purpose of material which has settled on the shaft base 15 not being swirled up again. The flow-breaking device 24 comprises several flow-breaking elements 42a-c which are transverse to the flow direction. As is particularly shown in FIGS. 3 and 4, the flow-breaking elements 42a-c are arranged downstream of the outlet opening 23 in the throughflow direction 26, are therefore located below the run-in chamber 18.

The flow-breaking elements 42a-c in this example are designed in a sword-like manner and in the example are shown in the form of three plate-like flow-breaking elements 42a-c which are arranged at regular distances to one another in a star-like manner. The flow-breaking elements 42a-c are connected to one another as one piece and together form a stand frame 43 for the run-in chamber and run-out chamber 18 which are located thereabove. For example, it is possible for the lower edge of the run-in chamber side wall 20 to sit on the stand frame 43. Herein, what is essential, as already mentioned, is that the flow-breaking elements are transverse to the flow direction. In the shown example, a tangential flow arises in the run-in chamber, said tangential flow being broken by the flow-breaking elements which are aligned transversely thereto and which are aligned in the height direction.

As is particularly shown in FIG. 3, height-adjustable feet 44 are located on the lower side of the stand frame 43 and specifically on at least two of the three feet 4 which are arranged on the flow-breaking elements 4. By way of this, it is possible to adjust the installation position of the sedimentation insert 12.

As is further shown in FIGS. 3 and 4, stiffening webs 45 which provide the stand frame 43 with an adequate stability are arranged between two adjacent flow-breaking elements 42 in each case.

The flow-breaking device 24 further comprises a grating 46 which in the shown example is arranged somewhat below the outlet opening 23. The grating 46 also serves for breaking the turbulent tangential flow in the run-in chamber 18.

On operation, downpour water which is contaminated with sediment runs into the run-in chamber 18 via the run-in pipe 21 and the run-in opening 19. Herein, the inflowing rainwater hits the flow guidance element 28 in the form of the deflector and is led in the direction of the inner wall of the run-in chamber 18. A tangential flow arises; said flow ensuring that a relatively high speed and thus a high throughput arise within the run-in chamber 18. Water flows downwards in the run-in chamber 18 and gets into the funnel-shaped run-out chamber 32 where it then exits via the outlet opening 23 into the inside of the shaft element 13. The flow-breaking device 24 with the two plate-like flow-breaking elements 42 ensures a calming of the flow, which is to say the breaking of the tangential flow. Swept-along sediments settle on the shaft base 15. The flow-breaking elements 42 which are arranged in a star-shaped manner prevent a tangential flow on the shaft base 15.

The downpour water now rises upwards in the inside of the shaft element 13 and flows over the spillway 38 in the form of the jagged weir. The downpour water which flows over is essentially free of sediment which is deposited in the shaft base 15. The rainwater via the jagged weir gets into the run-out chamber 32 from where is can only flow away via the run-out opening 25. The downpour water which is purified in such a manner then flows away via the run-out opening 25 and can be led from there into the sewage system, into water or also for seepage.

What is claimed is:

1. A sedimentation device for material which is contained in fluid, with a sedimentation insert, which, in the position of use, is inserted into a shaft element, wherein the sedimentation insert comprises a run-in chamber, said run-in chamber being delimited by a run-in chamber side wall and being provided with a lateral run-in opening and, on its lower side, comprising an outlet opening, wherein a flow-breaking device for breaking the flow of a fluid flow which is produced in a throughflow direction between the run-in opening and a run-out opening is assigned to the outlet opening, and wherein the sedimentation insert comprises a run-out chamber which annularly surrounds the run-in chamber and which is delimited by an inner run-out chamber side wall, a base and an outer run-out chamber side wall, wherein the run-out opening is formed on the delimitation of the run-out chamber and wherein the outer run-out chamber side wall is designed as a spillway;

wherein a flow guidance element is arranged in the run-in chamber downstream of the run-in opening in the throughflow direction in a manner such that inflowing fluid can be brought into a tangential flow, and wherein the flow guidance element comprises a vertical limb which runs in a height direction of the run-in chamber and is aligned obliquely with respect to the mouth surface of the run-in opening, wherein the vertical limb is connected as one piece to a horizontal limb which is connected in an angled manner to the vertical limb and is likewise connected as one piece to the run-in chamber.

2. The sedimentation device according to claim 1, wherein the run-in chamber side wall is designed in a cylindrical manner.

3. The sedimentation device according to claim 1, wherein the run-in chamber comprises a run-in section which is assigned to the run-in opening and an outlet section which is assigned to the outlet opening and which, in the throughflow direction, is arranged downstream of the run-in section.

4. The sedimentation device according to claim 3, wherein the outlet section is designed in a funnel-shaped manner.

5. The sedimentation device according to claim 1, wherein the inner run-out chamber side wall is formed by the run-in chamber side wall.

6. The sedimentation device according to claim 1, wherein the spillway is designed as a weir.

7. The sedimentation device according to claim 6, wherein the weir is designed as a jagged weir with a multitude of jags which in the peripheral direction of the outer run-out chamber side wall form the upper edge of the outer run-out chamber side wall.

8. The sedimentation device according to claim 7, wherein the jags have the shape of equilateral triangles.

9. The sedimentation device according to claim 1, wherein the flow-breaking device comprises at least one flow-breaking element which is perpendicular to the flow direction.

10. The sedimentation device according to claim 9, wherein the flow-breaking element is arranged downstream of the outlet opening in the throughflow direction.

11. The sedimentation device according to claim 9, wherein the flow-breaking element comprises a plurality of plate-like flow-breaking elements arranged at regular distances to one another in a star-like manner.

12. The sedimentation device according to claim 9, wherein the flow-breaking element forms a stand frame, on which the sedimentation insert stands in the shaft element in the position of use.

13. The sedimentation device according to claim 1, wherein the flow-breaking device comprises a grating which is arranged in the outlet opening or below the outlet opening.

14. The sedimentation device according to claim 1, wherein the run-out opening is arranged on the outer run-out chamber side wall.

15. The sedimentation device according to claim 14, wherein the run-out opening is adjustable in height.

16. The sedimentation device according to claim 1, wherein the sedimentation insert consists of plastic.

17. The sedimentation device according to claim 1, further comprising a shaft element.

18. The sedimentation device according to claim 1, further comprising a closed run-in tube for conveying fluid into the run-in chamber, wherein the run-in tube is configured to prevent direct fluid flow between the run-in opening and the run-out opening via the run-out chamber.

19. A sedimentation device for material which is contained in fluid, with a sedimentation insert which, in the position of use, is inserted into a shaft element, wherein the sedimentation insert comprises a run-in chamber, said run-in chamber being delimited by a run-in chamber side wall and being provided with a lateral run-in opening and, on its lower side, comprising an outlet opening, wherein a flow-breaking device for breaking the flow of a fluid flow which is produced in a throughflow direction between the run-in opening and a run-out opening is assigned to the outlet opening, and wherein the sedimentation insert comprises a run-out chamber which annularly surrounds the run-in chamber and which is delimited by an inner run-out chamber side wall, a base and an outer run-out chamber side wall, wherein the run-out opening is formed on the delimitation of the run-out chamber and wherein the outer run-out chamber side wall is designed as a spillway;

wherein the flow-breaking device comprises a flat grating which is arranged in the outlet opening or below the outlet opening.

* * * * *